US012589817B2

(12) United States Patent
Friend et al.

(10) Patent No.: US 12,589,817 B2
(45) Date of Patent: Mar. 31, 2026

(54) FUEL TANK BOOST AND BOLT SECURE

(71) Applicant: TOYOTA MOTOR ENGINEERING & MANUFACTURING NORTH AMERICA, INC., Plano, TX (US)

(72) Inventors: Ronald Scott Friend, Jeffersonville, KY (US); Robert Aaron Allex, Ewing, KY (US); Brian McElroy, Winchester, KY (US); David L. Brock, Versailles, KY (US); Christopher L. Rexroat, Paris, KY (US)

(73) Assignees: TOYOTA MOTOR ENGINEERING & MANUFACTURING NORTH AMERICA, INC., Plano, TX (US); TOYOTA JIDOSHA KABUSHIKI KAISHA, Toyota (JP)

( * ) Notice: Subject to any disclaimer, the term of this patent is extended or adjusted under 35 U.S.C. 154(b) by 510 days.

(21) Appl. No.: 17/824,837

(22) Filed: May 25, 2022

(65) Prior Publication Data

US 2023/0382479 A1    Nov. 30, 2023

(51) Int. Cl.
*B62D 65/02* (2006.01)
*B60K 15/067* (2006.01)

(52) U.S. Cl.
CPC .......... *B62D 65/026* (2013.01); *B60K 15/067* (2013.01)

(58) Field of Classification Search
CPC .............................. B62D 65/026; B60K 15/067
See application file for complete search history.

(56) References Cited

U.S. PATENT DOCUMENTS

2021/0094808 A1*   4/2021   Friend ...................... B66F 9/18

FOREIGN PATENT DOCUMENTS

| CN | 213702408 U | 7/2021 | |
| JP | H06144315 A | 5/1994 | |
| KR | 19990026157 U | 7/1999 | |
| KR | 20070062116 A * | 6/2007 | ............. B60K 15/03 |
| KR | 20090036776 A | 4/2009 | |

OTHER PUBLICATIONS

Machine Translation of KR20070062116A. "Coupling apparatus for Fuel Tank" by Ko Jung Hun. Jun. 15, 2007 (Year: 2007).*
Description of KR20070062116A (Year: 2007).*

* cited by examiner

*Primary Examiner* — Nirvana Deonauth
(74) *Attorney, Agent, or Firm* — SHEPPARD, MULLIN, RICHTER & HAMPTON LLP; Daniel N. Yannuzzi

(57) ABSTRACT

Systems and methods of lifting and installing a fuel tank on a vehicle are provided. In particular, a lifting apparatus may (1) receive fasteners and fuel tank bands prior to lifting, the fasteners secured/extended through fastener openings of the fuel tank bands; (2) lift, in a first lifting stage, the received fuel tank bands to a ground-facing surface of a fuel tank (the fuel tank may be resting on a pedestal or a similar support structure) such that the fuel tank bands cradle the fuel tank; and (3) lift, in a second lifting stage, the received fuel tank bands and the cradled fuel tank to the underside of a vehicle for installation.

6 Claims, 8 Drawing Sheets

FUEL TANK BOOST AND BOLT SECURE

TECHNICAL FIELD

The present disclosure relates generally to automotive systems and technologies, and more particularly, some examples relate to installing fuel tanks on vehicles.

DESCRIPTION OF RELATED ART

Fuel tanks are typically installed on the underside of a vehicle. In many cases, fuel tank bands (e.g., metal brackets) used to cradle the fuel tank from beneath (i.e., the fuel tank bands may support the fuel tank through placement beneath a ground-facing surface of the fuel tank) are fastened to the underside of the vehicle, thereby securing the cradled fuel tank to the underside of the vehicle.

When installing a fuel tank, a vehicle is typically lifted to an elevated position to provide greater access to the underside of the vehicle. The fuel tank (and the fuel tanks bands which cradle it) must then be lifted to the underside of the vehicle for installation.

BRIEF SUMMARY OF THE DISCLOSURE

According to various examples of the disclosed technology, an apparatus for lifting a fuel tank to an underside of a vehicle is provided. The fuel tank lifting apparatus may comprise: (1) a vertically oriented first actuator mechanically connected to a horizontally oriented first lifting base, the first actuator positioned beneath a ground facing surface of the first lifting base; (2) the first lifting base; (3) a vertically oriented second actuator mechanically connected to the first lifting base and a horizontally oriented second lifting base, the second actuator positioned between a vehicle-facing surface of the first lifting base and a ground-facing surface of the second lifting base; (4) the second lifting base; and (5) a vertically oriented first fastening gun mounted on the second lifting base, the first fastening gun having a top distal end configured to receive a head of a vertically oriented first fastener. The first fastening gun can be configured to receive a horizontally oriented fuel tank band, the fuel tank band configured to cradle the fuel tank from beneath a ground-facing surface of the fuel tank. The fuel tank band may comprise a first fastener opening located at a first distal end of the fuel tank band. When the fuel tank band is received by the first fastening gun, the first fastener may be secured through the first fastener opening of the fuel tank band.

In various examples, a computer-implemented method for installing a fuel tank to the underside of a vehicle chassis is provided. The method may comprise: (1) receiving, onto a first vertically oriented fastening gun of a fuel tank lifting apparatus, a head of a vertically oriented first fastener, the first fastener comprising the head and a shank extending upwards from the head; (2) receiving, onto the first fastener, a horizontally oriented fuel tank band, the fuel tank band comprising a first fastener opening located at a first distal end of the fuel tank band, wherein when the fuel tank band is received onto the first fastener the shank of the first fastener extends through the first fastener opening of the received fuel tank band; (3) lifting the received fuel tank band to a position where the received fuel tank band cradles a fuel tank; and (4) lifting the received fuel tank band and the cradled fuel tank to a ground-facing surface of a vehicle. In various examples, the method may further comprise: (1) receiving, onto a second vertically oriented fastening gun of the fuel tank lifting apparatus, a head of a vertically oriented second fastener, the second fastener comprising the head and a shank extending upwards from the head; and (2) receiving, onto the second fastener, the fuel tank band, the fuel tank band further comprising a second fastener opening located at a second distal end of the fuel tank band, wherein when the fuel tank band is received onto the second fastener the shank of the second fastener extends through the second fastener opening of the received fuel tank band. In certain examples, the method may further comprise securing the received fuel tank band and the cradled fuel tank to the ground-facing surface of the vehicle.

Other features and aspects of the disclosed technology will become apparent from the following detailed description, taken in conjunction with the accompanying drawings, which illustrate, by way of example, the features in accordance with examples of the disclosed technology. The summary is not intended to limit the scope of any inventions described herein, which are defined solely by the claims attached hereto.

BRIEF DESCRIPTION OF THE DRAWINGS

The present disclosure, in accordance with one or more various examples, is described in detail with reference to the following figures. The figures are provided for purposes of illustration only and merely depict examples.

Figure 1:
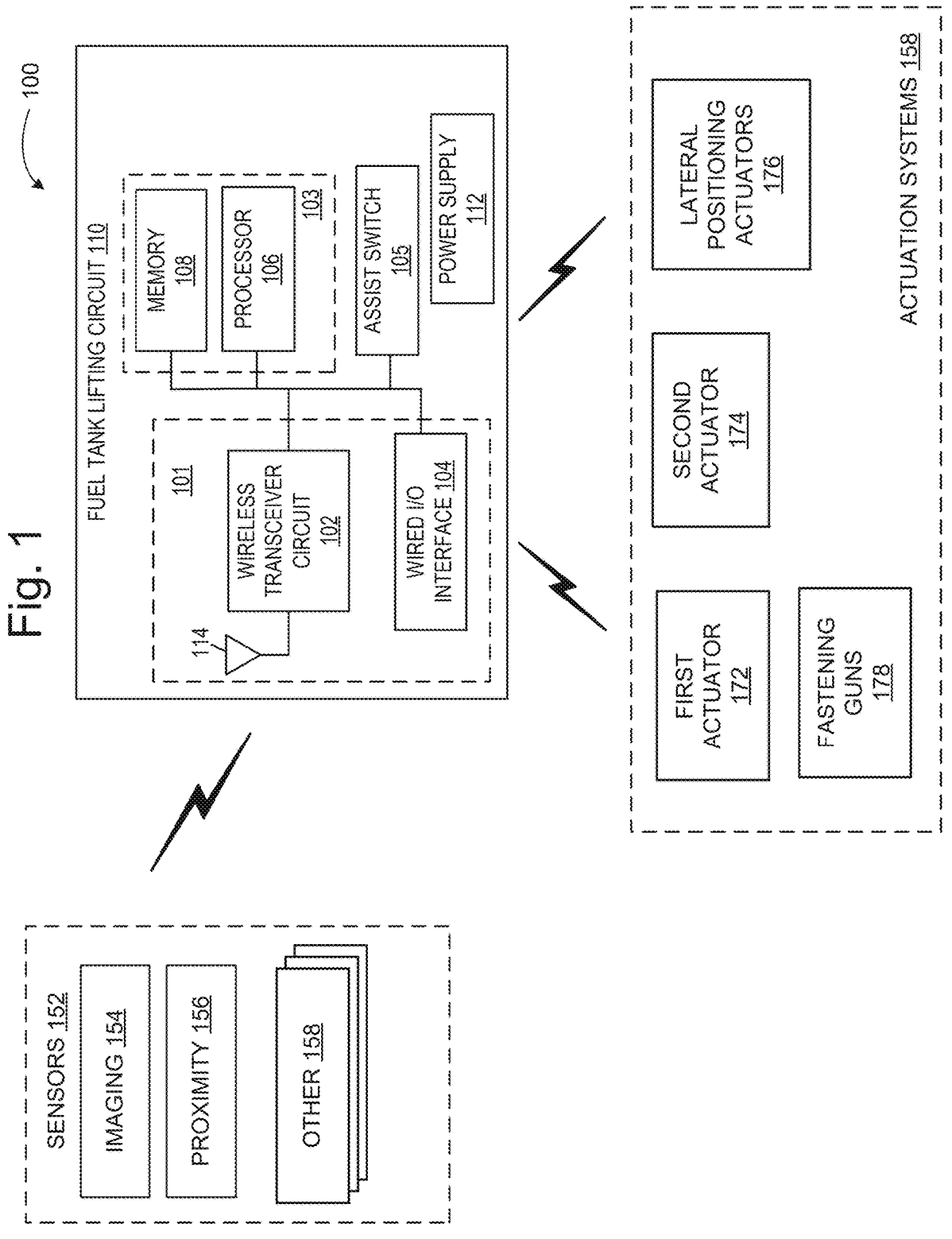
FIG. 1 illustrates an example architecture for controlling components of a fuel tank lifting apparatus, in accordance with examples of the systems and methods described herein.

The figures are not exhaustive and do not limit the present disclosure to the precise form disclosed.

DETAILED DESCRIPTION

As described above, when installing a fuel tank, a vehicle is typically lifted to an elevated position to provide greater access to the underside of the vehicle. The fuel tank (and the fuel tanks bands which cradle it) must then be lifted to the underside of the vehicle for installation. Due to the weight of a typical fuel tank, a lifting apparatus is often used to lift and support the fuel tank during installation.

Misalignment between fasteners and fastener openings is a common problem during lifting/installation of fuel tanks. Relatedly (and in some cases resulting from said misalignment), fasteners are often dropped during the lifting stage, which can cause delays in vehicle assembly.

To address these problems, examples of the presently disclosed technology provide a lifting apparatus configured to (1) receive fasteners and fuel tank bands prior to lifting, the fasteners secured/extended through fastener openings of the fuel tank bands; (2) lift, in a first lifting stage, the received fuel tank bands to a ground-facing surface of a fuel tank (the fuel tank may be resting on a pedestal or a similar support structure) such that the fuel tank bands are in a position to cradle the fuel tank; and (3) lift, in a second lifting stage, the received fuel tank bands and the cradled fuel tank to the underside of a vehicle for installation. In certain examples, the lifting apparatus may also be configured to secure/drive the received fasteners through fastener openings located at the underside of the vehicle, thereby securing the received fuel tank bands and the cradled fuel tank to the underside of the vehicle.

Examples of the presently disclosed technology may reduce misalignment between fasteners and fastener openings when lifting/installing a fuel tank to the underside of a vehicle. Relatedly, by securing fasteners through fastener openings of fuel tank bands prior to lifting, examples may reduce the occurrence of fasteners being dropped during lifting/installation. In this way, examples may improve installation time and efficiency.

In various examples, the lifting apparatus described above may comprise: (1) a vertically oriented first actuator mechanically connected to a horizontally oriented first lifting base of a top lifting assembly, the first actuator positioned beneath a ground facing surface of the first lifting base; (2) the first lifting base; (3) a vertically oriented second actuator mechanically connected to the first lifting base and a horizontally oriented second lifting base, the second actuator positioned between a vehicle-facing surface of the first lifting base and a ground-facing surface of the second lifting base; (4) the second lifting base; and (d) one or more vertically oriented fastening guns mounted on the second lifting base, a given fastening gun having a top distal end configured to receive a head of a vertically positioned fastener (here a given vertically oriented fastener may comprise the head located at a bottom distal end of the given fastener, a point located at a top distal end of the given fastener, and a shank which connects the head and the point). As alluded to above, fastener openings located at the distal ends of fuel tank bands may be received onto the received fasteners (in other words, the shanks of the received fasteners may extend through the fastener openings of the received fuel tank bands). Accordingly, the lifting apparatus may support the received fuel tank bands during lifting and installation as the weight of the received fuel tanks bands rests on the received fasteners, and by extension the fastening guns of the lifting apparatus.

As described above, the lifting apparatus may comprise a first actuator (e.g., a hydraulic or pneumatic cylinder) to perform the lifting in the first lifting stage, and a second actuator (e.g., another hydraulic or pneumatic cylinder) to perform the lifting in the second lifting stage. Examples may utilize two actuators instead of one in order to reduce the height of the lifting apparatus. In particular, examples may achieve a reduced height for the lifting apparatus by staggering the placement of the first and second actuator (see e.g., FIGS. 5-6). Reducing the overall height of a fuel tank lifting apparatus may be advantageous as the fuel tank lifting apparatus must be able to fit underneath a raised vehicle during fuel tank installation.

As will be described in greater detail below, various examples may automatically adjust their positioning/configuration in response to detecting different vehicle types during installation. As background, in many cases different vehicle types (e.g., different makes and models of vehicles) will have different fuel tanks installed on them. These fuel tanks may have different dimensions, and may be secured to the bottom of a vehicle utilizing fuel tank bands having different dimensions. In other words, fuel tank bands used for different vehicle types may have different distances/spacings between fastener openings located at their distal ends (relatedly, different vehicle types may have different locations for fastener openings used to secure fuel tanks bands to the vehicle). To address the varied dimensions of fuel tank bands and fuel tanks across different vehicle types, examples may (1) detect a vehicle type for a vehicle (i.e., a vehicle being worked on); and (2) prior to receiving fuel tank bands for the vehicle, automatically adjust the lateral positions of the fastening guns along the second lifting base in accordance with known fuel tank mounting specifications for the vehicle's vehicle type. Such pre-adjustment may ensure that fasteners are aligned with fastener openings of the fuel tank bands when the fuel tank bands are received by the lifting apparatus. Similarly, such pre-adjustment may ensure that fastener openings located at the underside of the vehicle are aligned with the fasteners during lifting and installation.

FIG. 1 illustrates an example architecture for controlling components of a fuel tank lifting apparatus, in accordance with examples of the systems and methods described herein. Referring now to FIG. 1, in this example, fuel tank lifting system 100 includes a fuel tank lifting circuit 110, a plurality of sensors 152, and a plurality of actuation systems 158. Sensors 152 and actuation systems 158 can communicate with fuel tank lifting circuit 110 via a wired or wireless communication interface. Although sensors 152 and actuation systems 158 are depicted as communicating with fuel tank lifting circuit 110, they can also communicate with each other as well as with other systems. As will be described in greater detail below, fuel tank lifting circuit 110 can be implemented as a controller located at/affixed to a fuel tank lifting apparatus. In other examples, fuel tank lifting circuit 110 can be implemented as a controller located remotely from the fuel tank lifting apparatus.

Fuel tank lifting circuit 110 in this example includes a communication circuit 101, a decision circuit (including a processor 106 and memory 108 in this example) and a power supply 112. Components of fuel tank lifting circuit 110 are illustrated as communicating with each other via a data bus, although other communication in interfaces can be included. Fuel tank lifting circuit 110 in this example also includes a manual assist switch 105 that can be operated by the user to manually select the automatic fuel tank lifting mode.

Processor 106 can include a GPU, CPU, microprocessor, or any other suitable processing system. The memory 108 may include one or more various forms of memory or data storage (e.g., flash, RAM, etc.) that may be used to store the calibration parameters, images (analysis or historic), point parameters, instructions and variables for processor 106 as well as any other suitable information. Memory 108, can be made up of one or more modules of one or more different types of memory, and may be configured to store data and other information as well as operational instructions that may be used by the processor 106. As described above, in various examples memory 108 may include operational instructions for adjusting lateral positions of fastening guns in response detecting various vehicle types.

Although the example of FIG. 1 is illustrated using processor and memory circuitry, as described below with reference to circuits disclosed herein, decision circuit 103 can be implemented utilizing any form of circuitry including, for example, hardware, software, or a combination thereof. By way of further example, one or more processors, controllers, ASICs, PLAs, PALs, CPLDs, FPGAs, logical components, software routines or other mechanisms might be implemented to make up a fuel tank lifting circuit 110.

Communication circuit 101 may include either or both of a wireless transceiver circuit 102 with an associated antenna 114 and a wired I/O interface 104 with an associated hardwired data port (not illustrated). As this example illustrates, communications with fuel tank lifting circuit 110 can include either or both wired and wireless communications. Wireless transceiver circuit 102 can include a transmitter and a receiver (not shown) to allow wireless communications via any of a number of communication protocols such as, for example, WiFi, Bluetooth, near field communications (NFC), Zigbee, and any of a number of other wireless communication protocols whether standardized, proprietary, open, point-to-point, networked or otherwise. Antenna 114 is coupled to wireless transceiver circuit 102 and is used by wireless transceiver circuit 102 to transmit radio signals wirelessly to wireless equipment with which it is connected and to receive radio signals as well.

Wired I/O interface 104 can include a transmitter and a receiver (not shown) for hardwired communications with other devices. For example, wired I/O interface 104 can provide a hardwired interface to other components, including sensors 152 and actuation systems 158. Wired I/O interface 104 can communicate with other devices using Ethernet or any of a number of other wired communication protocols whether standardized, proprietary, open, point-to-point, networked or otherwise.

Power supply 112 can include one or more of a battery or batteries (such as, e.g., Li-ion, Li-Polymer, NiMH, NiCd, NiZn, and NiH$_2$, to name a few, whether rechargeable or primary batteries), a power connector (e.g., to connect to vehicle supplied power, etc.), an energy harvester (e.g., solar cells, piezoelectric system, etc.), or it can include any other suitable power supply.

Sensors 152 can include, for example, imaging sensors 154 (e.g., cameras) and proximity sensors 156 (e.g., radar, LiDar, sonar, etc.,) for detecting (1) a vehicle type for a vehicle being worked on; (2) the position of various components of a fuel tank lifting apparatus (to be described in conjunction with FIGS. 5-7), as well as the position/location of fasteners and fastener openings used to secure fuel tank bands and/or a fuel tank to the underside of a vehicle. In some examples, sensors 152 may be used to detect an operational state of the first actuator (described above and in connection with FIGS. 5-7) corresponding to fuel tank band(s) being lifted to a position where they contact the ground-facing surface of a fuel tank such that they cradle the fuel tank. In examples where the first actuator comprises a first pneumatic or hydraulic cylinder, sensors 152 may comprise a sensor for detecting that a magnet located in a moving component of the first pneumatic/hydraulic cylinder (e.g., a piston of the cylinder) has reached a given height off the ground. This given height of the moving component of the first pneumatic/hydraulic cylinder may correspond to lifting received fuel tank bands to a height where they contact the ground facing surface of a fuel tank resting on a pedestal. To be described in greater detail below, in response to detecting that the moving component of the first pneumatic/hydraulic cylinder has reached the given height, examples may initiate a second lifting stage where the second actuator (described above and in connection with FIGS. 5-7) lifts the received fuel tank band(s) and the cradled fuel tank, to the underside of a vehicle for installation.

Figure 5:
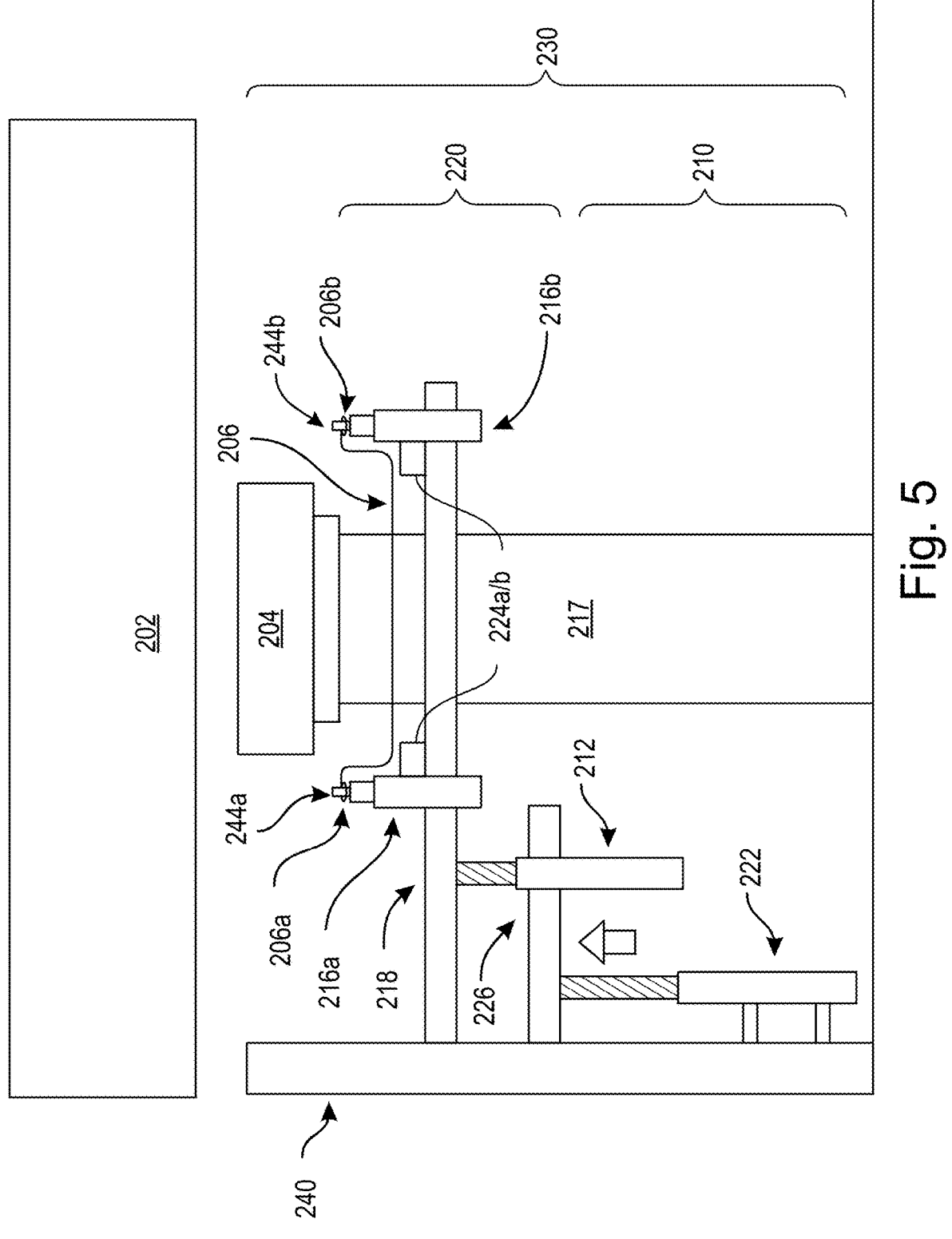
FIG. 5 is an example diagram illustrating an example first fuel tank lifting stage, in accordance with examples of the systems and methods described herein.
Figure 6:
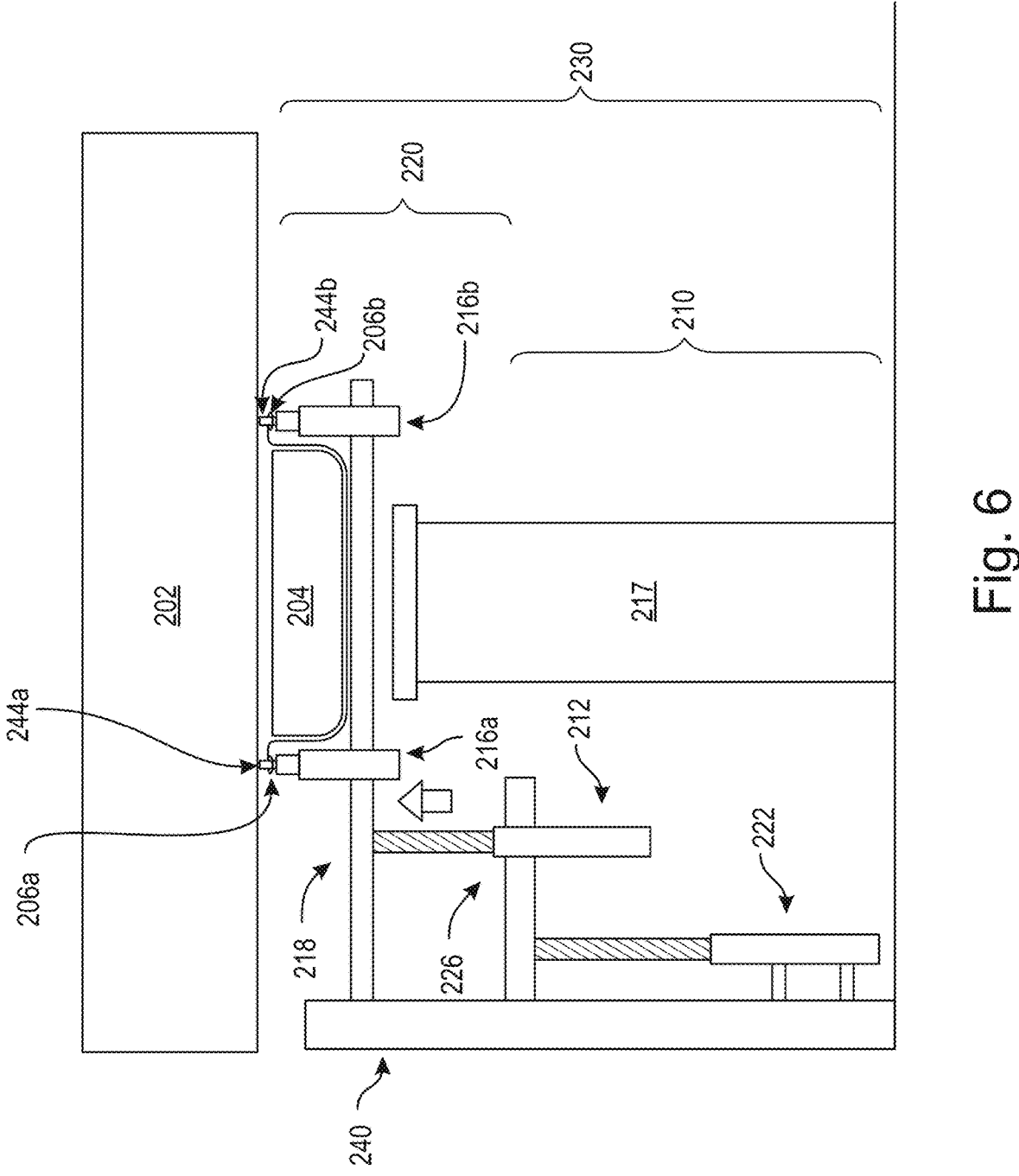
FIG. 6 is an example diagram illustrating an example second fuel tank lifting stage, in accordance with examples of the systems and methods described herein.
Figure 7:
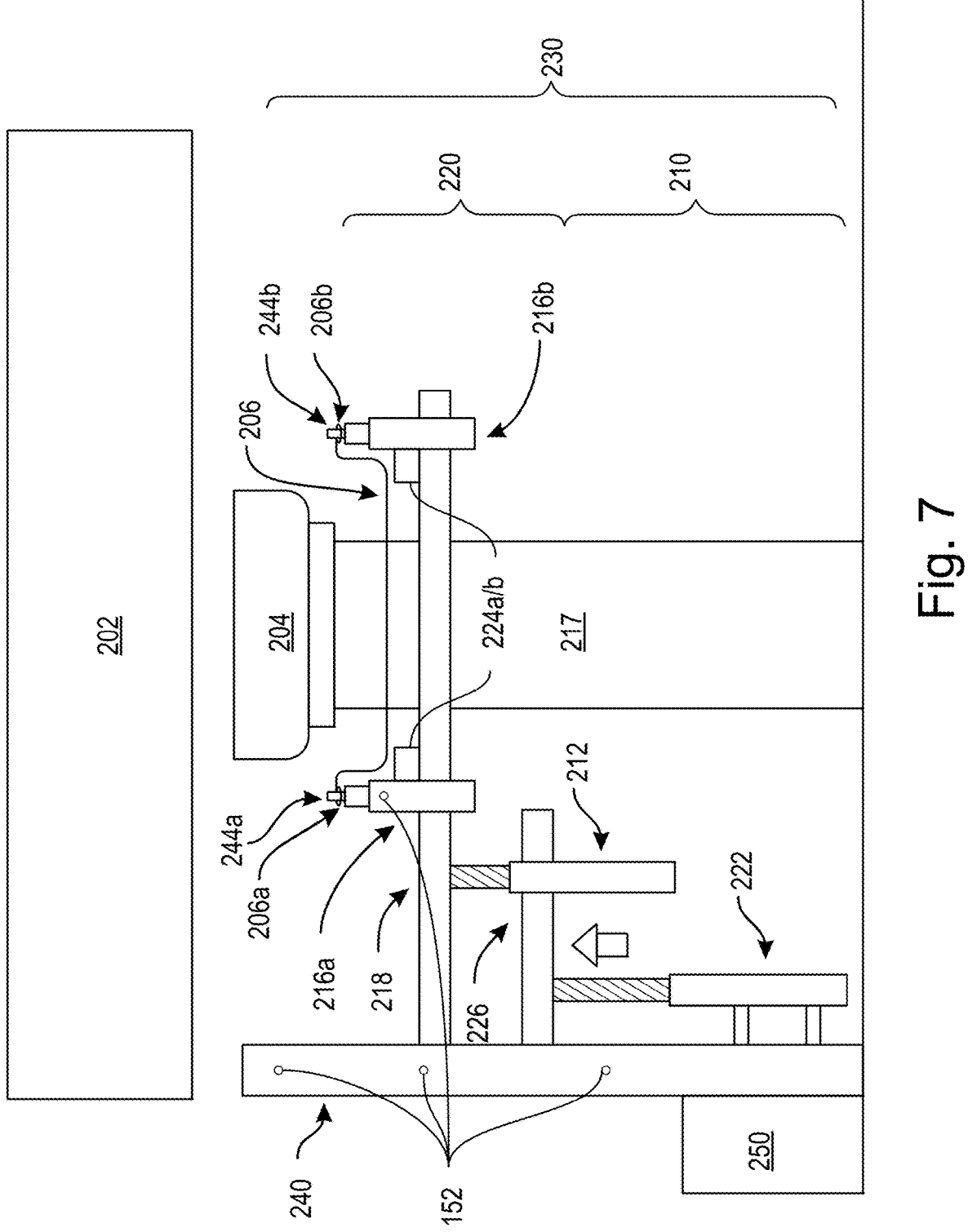
FIG. 7 is an example diagram illustrating how a controller may automatically control fuel tank lifting and installation, in accordance with examples of the systems and methods described herein.

Actuation systems 158 can include various components of a fuel tank lifting apparatus, such as those described in conjunction with FIGS. 5-7. In this example, actuation systems 158 include (1) first actuator 172 used for lifting during a first stage; (2) second actuator 174 used for lifting during a second stage; (3) lateral positioning actuators 176 for adjusting the lateral positions of fastening guns 178 of the lifting apparatus; and (4) fastening guns 178 for securing/driving fasteners through fastener openings located at the underside of a vehicle.

Figure 2:
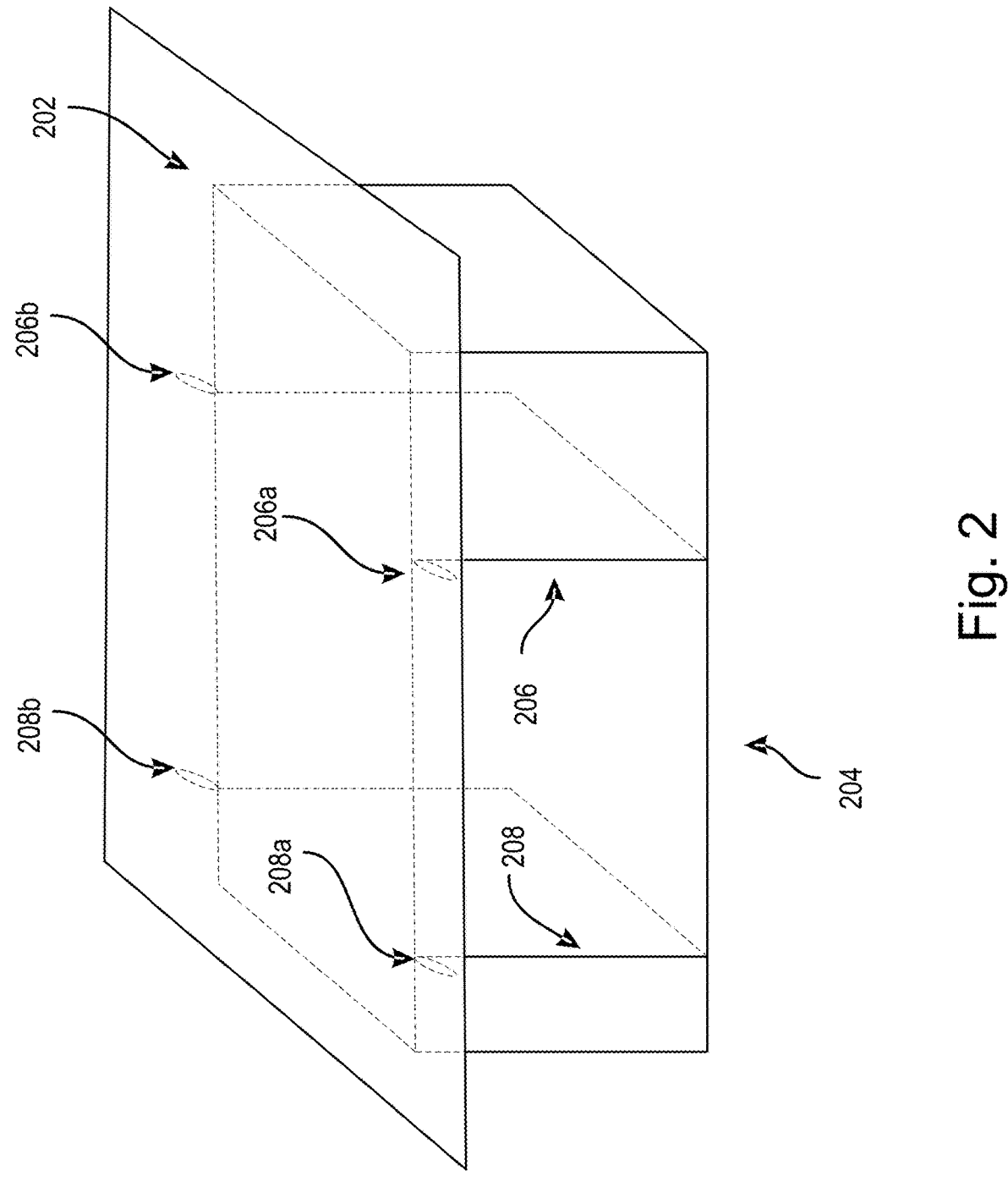
FIG. 2 is a first perspective view of a fuel tank installed on the underside of a vehicle using two fuel tank bands, in accordance with examples of the systems and methods described herein.

FIG. 2 is a first perspective view of a fuel tank 204 installed on the underside (i.e., ground-facing surface) of a vehicle 202 using fuel tank bands 206 and 208. As described above, fuel tank bands 206 and 208 may cradle fuel tank 204 from beneath a ground-facing surface of fuel tank 204 when all are installed on the underside vehicle 202. As depicted in the example of FIG. 2, two fuel tank bands are used to cradle fuel tank 204, but in various examples one or more fuel tank bands may be used.

Fuel tank bands 206 and 208 may be brackets or similar support structures configured to cradle/support fuel tank 204 from beneath a ground-facing surface of fuel tank 204.

A given fuel tank band may comprise two distal ends, with a fastener opening located at each distal end. For example, fuel tank band 206 may include fastener openings 206a and 206b, each fastener opening located at a distal end of fuel tank band 206. These fastener openings may be wide enough to allow a shank of a given fastener to extend through them, but narrow enough to restrict a head of the given fastener from extending through them. In certain examples, fastener openings 206a and 206b may be threaded, while in other examples they may not be threaded. In certain examples, fastener openings 206a and 206b may each include an internal grommet configured to tighten around the shank of a fastener extending through them.

As alluded to above, fuel tank bands 206 and 208 (and by extension fuel tank 204 which is cradled by fuel tank bands 206 and 208) may be secured to the underside of vehicle 202 by extending fasteners through their fastener openings (i.e., fastener openings 206a, 206b, 28a, and 208b) before driving the fasteners through fastener openings located at the underside of vehicle 202 (not pictured).

In various examples, a given fastener opening of a given fuel tank band may align with a fastener opening of fuel tank 204 (not pictured). Accordingly, a fastener may be extended through both the given fastener opening of the given fuel tank band and the fastener opening of fuel tank 204 before being driven through a fastener opening located at the ground-facing surface of vehicle 202. In certain examples, the fastener opening(s) of fuel tank 204 may be threaded, while in other examples they may not be threaded. In certain examples, the fastener opening(s) of fuel tank 204 may include an internal grommet configured to tighten around the shank of a fastener extending through them.

Figure 3:
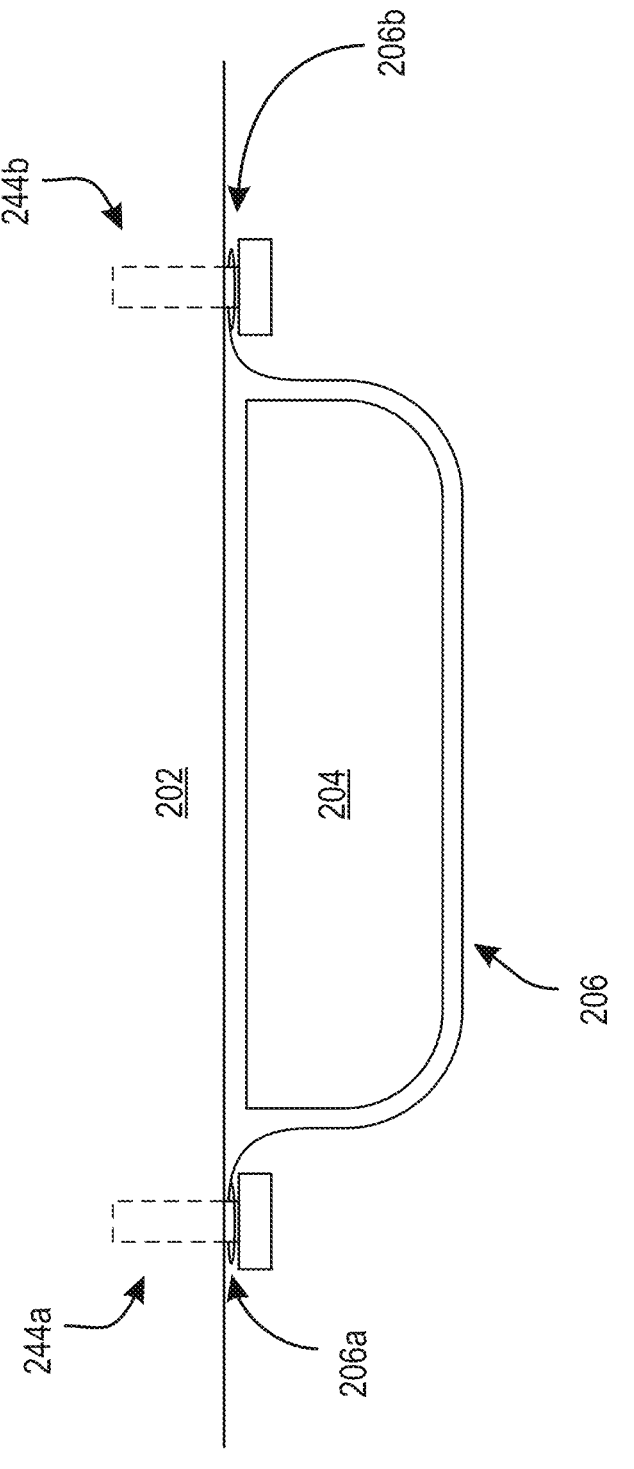
FIG. 3 is a second perspective view of a fuel tank installed on the underside of a vehicle using one or more fuel tank bands, in accordance with examples of the systems and methods described herein.

FIG. 3 is a second perspective view of fuel tank 204 installed on the underside of vehicle 202 using fuel tank band 206 (as described above, additional fuel tank bands, such as fuel tank band 208, may also be used to secure/cradle fuel tank 204). Components of FIG. 3 having reference numbers corresponding to component reference numbers of components introduced and described above with respect to FIG. 2 may have similar functionality and aspects, which will not be described again here in the interest of brevity.

As depicted in the example of FIG. 3, fasteners 244*a* and 244*b* secure fuel tank band 206 (and by extension fuel tank 204) to the underside of vehicle 202. To be described in greater detail in conjunction with FIG. 4, each fastener may comprise: a head (e.g., head 244*a*(i)); a point (e.g., point 244*a*(iii)); and a shank which connects the head to the shank (e.g., shank 244*a*(ii)).

Figure 4:
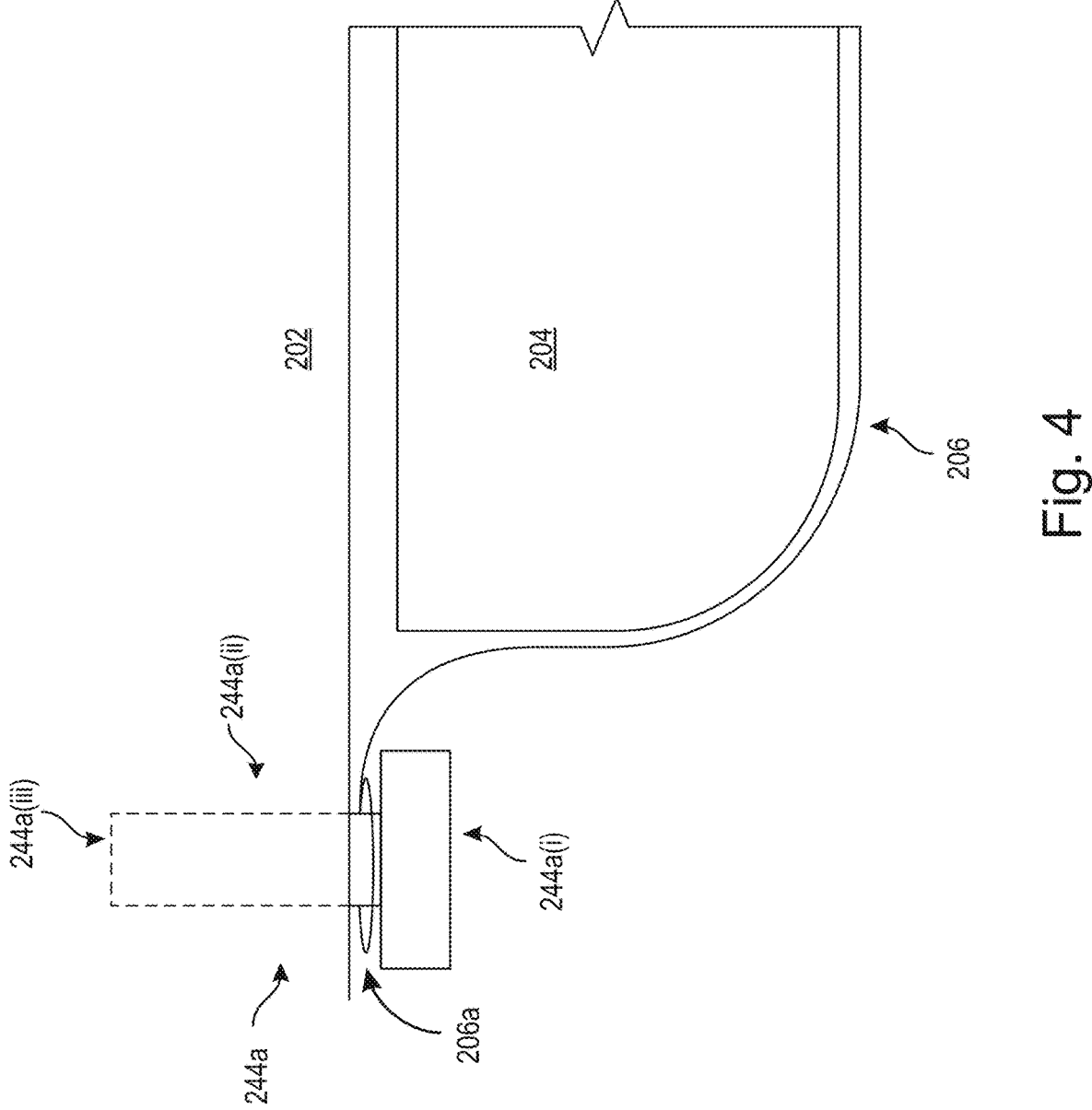
FIG. 4 is a zoomed-in perspective view of FIG. 3, in accordance with examples of the systems and methods described herein.

FIG. 4 is a zoomed-in perspective view of FIG. 3, in accordance with examples of the systems and methods described herein. As depicted, fastener 244*a* comprises a head 244*a*(i); a point 244*a*(iii); and a shank 244*a*(ii) which connects head 244*a*(i) to point 244*a*(ii). Components of FIG. 4 having reference numbers corresponding to component reference numbers of components introduced and described above with respect to FIGS. 2-3 may have similar functionality and aspects, which will not be described again here in the interest of brevity.

As depicted, when fuel tank band 206 is installed on the underside of vehicle 202, fastener opening 206*a* of fuel tank band 206 is sandwiched in between head 244*a*(i) and the underside of vehicle 202. In other words, head 244*a*(i) is located beneath a ground-facing side of fastener opening 206*a*, point 244*a*(iii) is located above a vehicle-facing side of fastener opening 206*a*, and shank 244*a*(ii) extends through fastener opening 206*a* (as depicted, fastener 244*a* also extends through a fastener opening and into a cavity located at the underside of vehicle 202).

In various examples fastener 244*a* may have threads (i.e., shank 244*a*(ii) may be threaded) used to secure fastener 244*a* to vehicle 202 (here the fastener opening/cavity that fastener 244*a* is driven into may have threads for receiving the threads of fastener 244*a*).

FIG. 5 is an example diagram illustrating an example first fuel tank lifting stage, in accordance with examples of the systems and methods described herein. Components of FIG. 5 having reference numbers corresponding to component reference numbers of components introduced and described above with respect to FIGS. 2-4 may have similar functionality and aspects, which will not be described again here in the interest of brevity.

FIG. 5 depicts how a lifting apparatus 230 may be used to (1) receive two vertically oriented fasteners (i.e., fasteners 244*a* and 244*b*) onto sockets (or similar fastener receiving structures) of two vertically oriented fastening guns (i.e., fastening guns 216*a* and 216*b*) of lifting apparatus 230; (2) receive, onto the two received fasteners respectively, a horizontally oriented fuel tank band 206, the two received fasteners extending through two fastener openings (i.e., fastener openings 206*a* and 206*b*) of the received fuel tank band 206; and (3) lift the received fuel tank band 206 to a position where the received fuel tank band 206 contacts a ground-facing surface of a fuel tank 204 such that the received fuel tank band 206 cradles fuel tank 204. This first lifting stage may precede a second lifting stage (to be described in conjunction with FIG. 6) where lifting apparatus 230 lifts received fuel tank band 206 and cradled fuel tank 204 to a ground-facing surface of a vehicle 202 for installation.

Referring now to the individual components of lifting apparatus 230, as depicted, fuel tank lifting apparatus 230 comprises a top lifting assembly 220 and a bottom lifting assembly 210.

Top lifting assembly 220 may comprise (1) a horizontally oriented first lifting base 226; (2) a horizontally oriented second lifting base 218; (3) a vertically oriented actuator 212 positioned between a vehicle-facing surface of first lifting base 226 and a ground-facing surface of second lifting base 218, actuator 212 being mechanically connected to both first lifting base 226 and second lifting base 218 (actuator 212 may be various types of actuators such as a hydraulic or pneumatic actuator/cylinder); and (4) two vertically positioned fastening guns (i.e., fastening guns 216*a* and 216*b*) mounted to second lifting base 218 (fastening guns 216*a* and 216*b* may be various types of fastening guns capable of receiving fasteners 244*a* and 244*b*, and driving them into fastener openings located at the underside of vehicle 202).

In various examples top lifting assembly 220 may further comprise actuators 224*a* and 224*b* mechanically connected to fastening guns 216*a* and 216*b* respectively (actuators 224*a* and 224*b* may be various types of actuators as well). As described above, actuators 224*a* and 224*b* may be used to adjust the lateral position of fastening guns 216*a* and 216*b* along second lifting base 218. In certain examples, such lateral adjustment may be performed in response to detecting a vehicle type for vehicle 202.

Bottom lifting assembly 220 may comprise an actuator 222 mechanically connected to first lifting base 226, actuator 222 being positioned beneath a ground-facing surface of first lifting base 226 (like actuator 212, actuator 222 may be various types of actuators such as a hydraulic or pneumatic actuator/cylinder). To be described in greater detail below, actuator 222 may lift top lifting assembly 220 in its entirety by raising first lifting base 226 relative to the ground.

In various examples actuator 222 may be fixedly mounted to a support structure 240. In these examples, first lifting base 226 and second lifting base 218 may be adjustably mounted to support structure 240 (i.e., they be raised and lowered along the height of support structure 240).

To be described in greater detail in conjunction with FIG. 7, lifting apparatus 230 may also comprise: (1) a controller (e.g., a controller implementing fuel tank lifting circuit 110) for controlling the actuators and fastening guns of lifting apparatus 230; and (2) sensors (e.g., sensors 152) for detecting a vehicle type for vehicle 202, and various operational conditions of lifting apparatus 230.

As alluded to above, in the first lifting stage, lifting apparatus 230 may (1) receive fasteners 244*a* and 244*b* onto sockets (or similar fastener receiving structures) of fastening guns 216*a* and 216*b*; (2) receive, onto received fasteners 244*a* and 244*b* respectively, fuel tank band 206, received fasteners 244*a* and 244*b* extending through fastener openings 206*a* and 206*b* of received fuel tank band 206 respectively; and (3) lift received fuel tank band 206 to a position where received fuel tank band 206 contacts the ground-facing surface of fuel tank 204 such that received fuel tank band 206 cradles fuel tank 204. These steps in the first lifting stage will now be described in more detail.

Receiving fasteners 244*a* and 244*b* fastening guns onto 216*a* and 216*b*: As describe above, fastening guns 216*a* and 216*b* may have sockets (or similar fastener receiving structures) located at their top distal ends configured to receive the heads of fasteners 244*a* and 244*b*. Accordingly, in the first lifting stage a worker (or machine) may secure fasteners 244*a* and 244*b* to fastening guns 216*a* and 216*b* respectively by placing the heads of the fasteners into the sockets of the fastening guns. As describe above (and as depicted in FIG. 5), the fastening guns and fasteners may be vertically oriented. Accordingly, gravity (in combination with the sockets themselves) may hold the fasteners in place during lifting and installation.

Receiving, onto received fasteners 244a and 244b respectively, fuel tank band 206: As described above, received fasteners 244a and 244b are vertically oriented such that their heads are ground-facing, and their points are vehicle-facing. Accordingly, in the first lifting stage a worker (or machine) may lower fastener openings 206a and 206b over the points of fasteners 244a and 244b respectively. As described above, examples of the presently disclosed technology may automatically adjust the lateral positions of fastening guns 216a and 216b according to known fuel tank mounting specifications for vehicle 202 (and/or fuel tank 204 and fuel tank band 206) so that fastener openings 206a and 206b of fuel tank band 206 automatically align with fasteners 244a and 244b respectively.

When fuel tank band 206 is received onto received fastener 244a and 244b: (i) the head of fastener 244a will be located beneath a ground-facing side of fastener opening 206a; (ii) the point of fastener 244a will be located above a vehicle-facing side of fastener opening 206a; (iii) the shank of fastener 244a will extend through fastener opening 206a; (iv) the head of fastener 244b will be located beneath a ground-facing side of fastener opening 206b; (v) the point of fastener 244b will be located above a vehicle-facing side of fastener opening 206b; and (vi) the shank of fastener 244b will extend through fastener opening 206b.

In the received position described above, fuel tank band 206 may be held in place and/or supported by fasteners 244a and 244b because the weight of fuel tank band 206 rests on the heads of fasteners 244a and 244b. In other words, because the weight of fuel tank band 206 rests on the heads of fasteners 244a and 244b— and by extension fastening guns 216a and 216b— fuel tank band 206 may be lifted by raising fastening guns 216a and 216b.

Lifting received fuel tank band 206 to a position where received fuel tank band 206 contacts the ground-facing surface of fuel tank 204 such that fuel tank band 206 cradles fuel tank 204: Once fuel tank band 206 has been received onto fasteners 244a and 244b, lifting apparatus 230 may be used to lift fuel tank band 206 to fuel tank 204. In particular, actuator 222 may be used to raise the entirety of top lifting assembly 220 (including fastening guns 216a and 216b) to a position where fuel tank band 206 contacts the ground-facing surface of a fuel tank 204.

As depicted, before it comes into contact with fuel tank band 206, fuel tank 204 may be supported by a pedestal 217. In various examples pedestal 217 may be incorporated into the structure of lifting apparatus 230, but in other examples pedestal 217 may comprise a separate structure from lifting apparatus 230.

As described above, the first lifting stage may be completed when lifting apparatus 230 (as actuated by actuator 222) raises received fuel tank band 206 to a position where received fuel tank band 206 contacts the ground-facing surface of a fuel tank 204 such that received fuel tank band 206 cradles fuel tank 204 (here it should be understood that lifting apparatus 230 may comprise duplicate components not pictured for receiving and lifting additional fuel tank bands to fuel tank 204; accordingly fuel tank 204 may be cradled by one or more additional fuel tank bands during the second lifting stage).

As will be described in conjunction with FIG. 6, during a second stage, lifting apparatus 230 may be used to lift received fuel tank band 206 and cradled fuel tank 204 to a ground-facing surface of vehicle 202 for installation.

As described above, in certain examples fuel tank 204 may comprise fastener openings designed to align with fastener opening 206a and/or fastener opening 206b. Accordingly, the first lifting stage may further comprise securing fastener 244a and/or fastener 244b through fastener openings of fuel tank 204. In this case, the head of a given fastener may be located beneath the ground-facing side of a given fuel tank band fastener opening, the fastener opening of the fuel tank may be located above the vehicle-facing side of the given fuel tank band fastener opening, the shank of the given fastener may extend through the given fuel tank band fastener opening and the fastener opening of the fuel tank, and the point of the given fastener may be located above the given fuel tank band fastener opening and the fastener opening of the fuel tank. In certain examples, sensors of lifting apparatus 230 may detect/determine whether fasteners have been secured through requisite fastener openings of fuel tank 204 before proceeding to the second lifting stage where cradled fuel tank 204 is lifting off of pedestal 217 by lifting apparatus 230.

Referring now to FIG. 6, as depicted, cradled fuel tank 204 has been lifted off of pedestal 217 by lifting apparatus 230 (as before, components of FIG. 6 having reference numbers corresponding to component reference numbers of components introduced and described above with respect to FIGS. 2-5 may have similar functionality and aspects, which will not be described again here in the interest of brevity). In particular, received fuel tank band 206 (and in certain examples one or more additional fuel tank bands not pictured) is now supporting the weight of fuel tank 204 by cradling the ground-facing surface of cradled fuel tank 204. Accordingly, by lifting received fuel tank band 206, lifting apparatus 230 may lift received fuel tank band 206 and cradled fuel tank 204 to the underside of vehicle 202 for installation.

As depicted, in this second lifting stage actuator 222 remains static, while actuator 212 lifts second lifting base 218 (and by extension fastening guns 216a and 216b) relative to first lifting base 226. As alluded to above, examples may utilize two actuators instead of one in order to reduce the overall height of the lifting apparatus 230. In particular, examples may achieve a reduced overall height by staggering the vertical placement of actuator 222 and 212 (as depicted in FIGS. 5-7). Reducing the overall height of a fuel tank lifting apparatus may be advantageous as the fuel tank lifting apparatus must be able to fit underneath a raised vehicle during fuel tank installation.

As described above, once received fuel tank band 206 has been lifted to the underside of vehicle 202, the second lifting stage may further comprise driving fasteners 244a and 244b into fastener openings located at the underside of vehicle 202. As will be described in conjunction with FIG. 7, a controller may automatically control these operations.

FIG. 7 is an example diagram illustrating how a controller may automatically control fuel tank lifting and installation, in accordance with examples of the systems and methods described herein. Components of FIG. 7 having reference numbers corresponding to component reference numbers of components introduced and described above with respect to FIGS. 2-6 may have similar functionality and aspects, which will not be described again here in the interest of brevity.

In particular, FIG. 7 depicts how a controller 250 may control various components of lifting apparatus 230 to (a) detect a vehicle type for vehicle 202; (b) based on the detected vehicle type for vehicle 202, adjust lateral positions of fastening guns 216a and 216b in accordance with known fuel tank mounting specifications for vehicle 202; (c) in response to receiving fasteners 244*a* and 244*b* and fuel tank band 206, lift received fuel tank band 206 to contact the ground facing surface of fuel tank 204; (d) determine that fuel tank 204 is in a proper cradled position with respect to fuel tank band 206 (and in certain examples, one or more fuel tank bands not pictured); (e) lift received fuel tank band 206 and cradled fuel tank 204 to the underside of vehicle 202; and (f) drive fasteners 244*a* and 244*b* through fastener openings located at the underside of vehicle 202.

As depicted, controller 250 is located on lifting apparatus 230. However in other examples controller 250 may be located remotely from lifting apparatus 230. In certain examples, fuel tank lifting circuit 110 may be implemented on controller 250.

Controller 250 may be in communication with sensors 152 (as described in conjunction with FIG. 1, controller 250/fuel tank lifting circuit 110 may communicate with sensors 152 via wired or wireless communication). Sensors 152 may be the same/similar as sensors 152 described in conjunction with FIG. 1. For example sensors 152 may comprise imaging sensors or proximity sensors. In general, sensors 152 may be positioned in various locations suitable to detect (1) a vehicle type for vehicle 202; (2) the operation and heights of actuators 212 and 222; (3) the operation of fastening guns 216*a* and 216*b*; (4) the position and alignment of fasteners 244*a* and 244*b* with respect to fastener openings 206*a* and 206*b* respectively; (5) the position and alignment of fasteners 244*a* and 244*b* with respect fastener openings located at the underside of vehicle 202; (6) the position of fuel tank 204 with respect to fuel tank band 206; etc.

As described above, controller 250 may utilize sensors 152 to detect a vehicle type for vehicle 202. In many cases, different vehicle types (e.g., different vehicle makes and models) may have different fuel tanks installed on them. These fuel tanks may have different dimensions, and may be secured to the bottom of a vehicle utilizing fuel tank bands having different dimensions. In other words, fuel tank bands used for different vehicle types may have different distances/ spacings between fastener openings located at their distal ends (relatedly, different vehicle types may have different locations for fastener openings used to secure fuel tanks bands to the vehicle). To address the varied fuel tank mounting specifications for different vehicle types, examples may (1) detect a vehicle type for a vehicle being worked on; and (2) prior to receiving fuel tank bands the vehicle being worked on, automatically adjust the lateral positions of the fastening guns along the second lifting base in accordance with known fuel tank mounting specifications for the detected vehicle type (e.g., dimensions for fuel tank bands used to secure fuel tanks to the vehicle type including spacing between fastener openings of the fuel tank band, locations of fastener openings on the underside of a vehicle for the vehicle type, fuel tank dimensions and locations of fastener openings on the fuel tank, fastener torque specifications, etc.). Such pre-adjustment may ensure that fasteners are aligned with fastener openings of the fuel tank bands and fastener openings located at the underside of the vehicle during lifting and installation. Accordingly, in response to detecting a vehicle type for vehicle 202, controller 250 may control actuators 224*a* and 224*b* to adjust lateral positions of fastening guns 216*a* and 216*b* respectively in accordance with known fuel tank mounting specifications for vehicle 202's vehicle type.

As described above, in response to receiving fasteners 244*a* and 244*b* and fuel tank band 206, controller 250 may control actuator 222 to lift the entirety of top lifting assembly 220, thereby lifting received fuel tank band 206. In various examples controller 250 may utilize sensors 152 to detect/determine that received fuel tank band 206 has been raised to a position where it contacts the ground-facing surface of fuel tank 204. In examples where actuator 222 comprises a pneumatic or hydraulic cylinder, sensors 152 may comprise a sensor for detecting that a magnet located in a moving component of the actuator 222 (e.g., a piston within a cylinder) has reached a given height off the ground. This given height of the moving component of actuator 222 may correspond to lifting received fuel tank band 206 to a height where it contacts the ground facing surface of fuel tank 204 when fuel tank 204 is resting on pedestal 217.

In various examples, before lifting fuel tank 204 off of pedestal 217, controller 250 may determine that fuel tank 204 is in a proper cradled position with respect to fuel tank band 206 (and in certain examples, one or more fuel tank bands not pictured). This may comprise detecting the position of fuel tank band 206 with respect to fuel tank 204 (i.e., whether it is in contact with proper surfaces of fuel tank 204) or detecting whether fuel tank 204 is stable when cradled by fuel tank band 206 (and in certain examples, one or more fuel tank bands not pictured).

As described above, in certain examples fuel tank 204 may have one or more fastener openings designed to align with fastener openings 206*a* and/or 206*b*. Accordingly, before lifting fuel tank 204 off of pedestal 217, controller 250 may use sensors 152 to determine that fastener 244*a* and/or fastener 244*b* has been secured/extended through the one or more fastener openings of fuel tank 204.

As described above (and in some examples, in response to determining fuel tank 204 is in a proper cradled position) controller 250 may control actuator 212 to lift received fuel tank band 206 and cradled fuel tank 204 to the underside of vehicle 202.

In certain examples, after received fuel tank 206 and cradled fuel tank 204 have been lifted to the underside of vehicle 202, controller 250 may control fastening guns 216*a* and 216*b* to drive fasteners 244*a* and 244*b* (respectively) through fastener openings located at the underside of vehicle 202. In some examples, prior to driving the fasteners, controller 250 may use sensors 152 to determine that the fasteners are aligned with the fastener openings located at the underside of vehicle 202. In some of these examples, in response to detecting misalignment, controller 250 may control actuators 224*a* and 244*b* to adjust the lateral position fastening guns 216*a* and 216*b* so that fasteners 244*a* and 244*b* are better aligned with the fastener openings located at the underside of vehicle 202.

Figure 8:
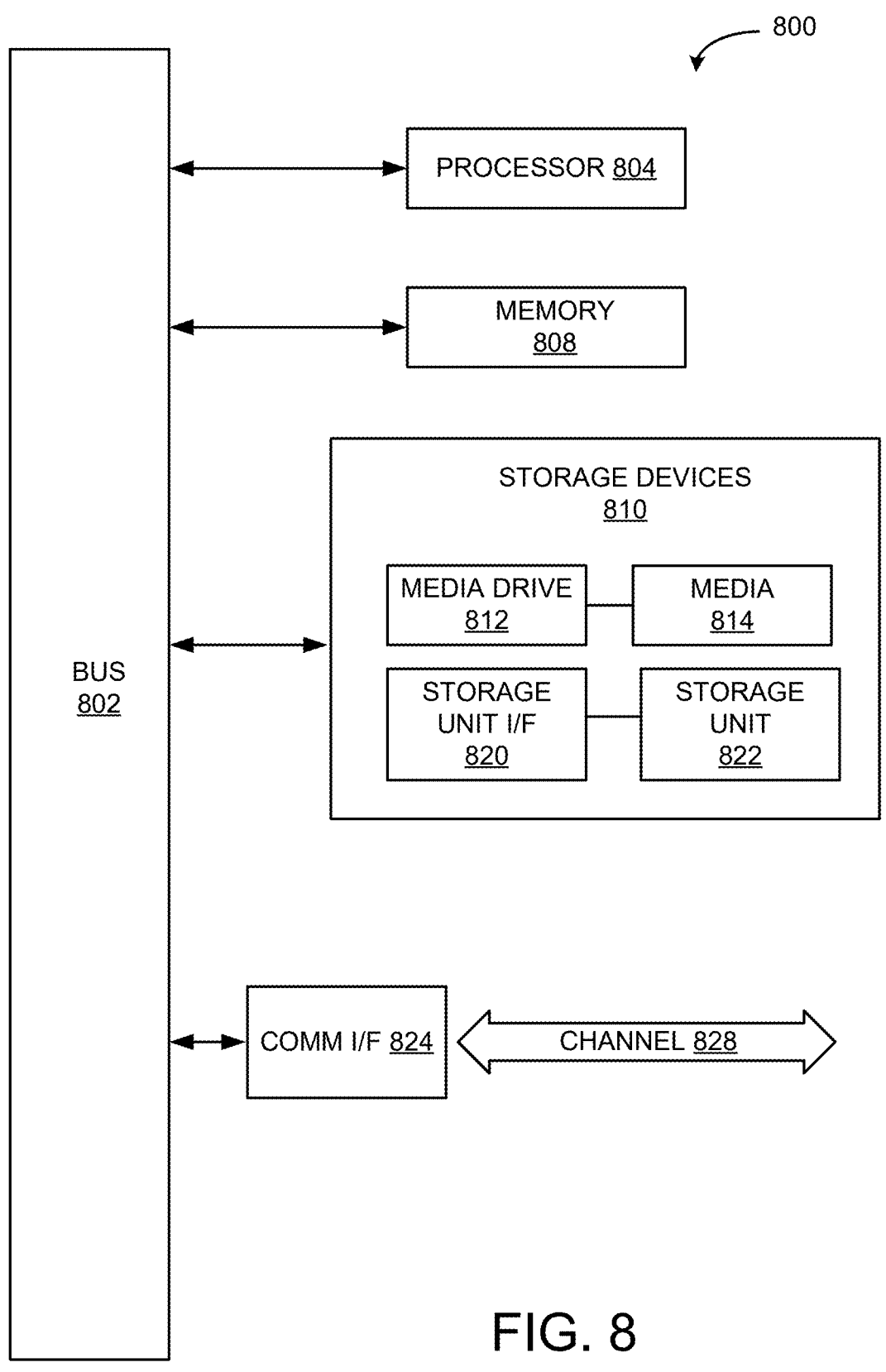
FIG. 8 is an example computing component that may be used to implement various features of examples described in the present disclosure.

As used herein, the terms circuit and component might describe a given unit of functionality that can be performed in accordance with one or more examples of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 8. Various examples are described in terms of this example-computing component 800. After reading this description, it will become apparent to a person skilled in the relevant art how to implement the application using other computing components or architectures.

Referring now to FIG. 8, computing component 800 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 800 might also represent computing capabilities embedded within or otherwise available to a given device. For example, a computing component might be found in other electronic devices such as, for example, portable computing devices, and other electronic devices that might include some form of processing capability.

Computing component 800 might include, for example, one or more processors, controllers, control components, or other processing devices. Processor 804 might be implemented using a general-purpose or special-purpose processing engine such as, for example, a microprocessor, controller, or other control logic. Processor 804 may be connected to a bus 802. However, any communication medium can be used to facilitate interaction with other components of computing component 800 or to communicate externally.

Computing component 800 might also include one or more memory components, simply referred to herein as main memory 808. For example, random access memory (RAM) or other dynamic memory, might be used for storing information and instructions to be executed by processor 804. Main memory 808 might also be used for storing temporary variables or other intermediate information during execution of instructions to be executed by processor 804. Computing component 800 might likewise include a read only memory ("ROM") or other static storage device coupled to bus 802 for storing static information and instructions for processor 804.

The computing component 800 might also include one or more various forms of information storage mechanism 810, which might include, for example, a media drive 812 and a storage unit interface 820. The media drive 812 might include a drive or other mechanism to support fixed or removable storage media 814. For example, a hard disk drive, a solid-state drive, a magnetic tape drive, an optical drive, a compact disc (CD) or digital video disc (DVD) drive (R or RW), or other removable or fixed media drive might be provided. Storage media 814 might include, for example, a hard disk, an integrated circuit assembly, magnetic tape, cartridge, optical disk, a CD or DVD. Storage media 814 may be any other fixed or removable medium that is read by, written to or accessed by media drive 812. As these examples illustrate, the storage media 814 can include a computer usable storage medium having stored therein computer software or data.

In alternative examples, information storage mechanism 810 might include other similar instrumentalities for allowing computer programs or other instructions or data to be loaded into computing component 800. Such instrumentalities might include, for example, a fixed or removable storage unit 822 and an interface 820. Examples of such storage units 822 and interfaces 820 can include a program cartridge and cartridge interface, a removable memory (for example, a flash memory or other removable memory component) and memory slot. Other examples may include a PCMCIA slot and card, and other fixed or removable storage units 822 and interfaces 820 that allow software and data to be transferred from storage unit 822 to computing component 800.

Computing component 800 might also include a communications interface 824. Communications interface 824 might be used to allow software and data to be transferred between computing component 800 and external devices. Examples of communications interface 824 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 824 may be carried on signals, which can be electronic, electromagnetic (which includes optical) or other signals capable of being exchanged by a given communications interface 824. These signals might be provided to communications interface 824 via a channel 828. Channel 828 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 808, storage unit 820, media 814, and channel 828. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 800 to perform features or functions of the present application as discussed herein.

In this document, the terms "horizontally oriented" and "vertically oriented" may refer to the orientation of a structure with respect to a ground surface. In other words, a horizontally oriented structure may make an approximately zero degree angle with respect to a ground surface (here it should be understood that a horizontally oriented structure need not make a precisely zero degree angle with respect to the ground surface, i.e., an offset of e.g., 5-10 degrees may be acceptable), and a vertically oriented structure may make an approximately 90 degree angle with respect to a ground surface (here it should be understood that a vertically oriented structure need not make a precisely 90 degree angle with respect to the ground surface, i.e., an offset of e.g., 5-10 degrees may be acceptable). Further while the angle between a horizontally oriented structure and a vertically oriented structure may be approximately 90 degrees, the angle between the two structure need not be precisely 90 degrees (i.e., an offset of e.g., 5-10 degrees may be acceptable).

It should be understood that the various features, aspects and functionality described in one or more of the individual examples are not limited in their applicability to the particular example with which they are described. Instead, they can be applied, alone or in various combinations, to one or more other examples, whether or not such examples are described and whether or not such features are presented as being a part of a described example. Thus, the breadth and scope of the present application should not be limited by any of the above-described exemplary examples.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various examples set forth herein are described in terms of exemplary block diagrams, flow charts and other illustrations. As will become apparent to one of ordinary skill in the art after reading this document, the illustrated examples and their various alternatives can be implemented without confinement to the illustrated examples. For example, block diagrams and their accompanying description should not be construed as mandating a particular architecture or configuration.

What is claimed is:

1. An apparatus for lifting a fuel tank to an underside of a vehicle, comprising:

a vertically oriented first actuator mechanically connected to a horizontally oriented first lifting base, an actuating portion of the first actuator positioned below a ground-facing surface of the first lifting base;

the first lifting base mechanically connected to the first actuator such that the actuating portion of the first actuator is positioned below the ground-facing surface of the first lifting base;

a vertically oriented second actuator mechanically connected to the first lifting base and a horizontally oriented second lifting base, an actuating portion of the second actuator positioned between a vehicle-facing surface of the first lifting base and a ground-facing surface of the second lifting base;

the second lifting base mechanically connected to the second actuator such that the actuating portion of the second actuator is positioned above the vehicle-facing surface of the first lifting base and below the ground-facing surface of the second lifting base; and a vertically oriented first fastening gun mounted on the second lifting base, the first fastening gun having a vehicle-facing end configured to receive a head of a vertically oriented first fastener;

wherein the first fastening gun is configured to receive a horizontally oriented fuel tank band, the fuel tank band configured to cradle the fuel tank from below a ground-facing surface of the fuel tank, wherein:

the fuel tank band comprises a first fastener opening located at a first distal end of the fuel tank band, and when the fuel tank band is received by the first fastening gun, the first fastener is secured through the first fastener opening of the fuel tank band.

2. The apparatus of claim 1, wherein:

the first fastener comprises the head located at a ground-facing end of the first fastener, a point located at a vehicle-facing end of the first fastener, and a shank which connects the head and the point; and when the first fastener is secured through the first fastener opening of the fuel tank band:

the head of the first fastener is positioned below a ground-facing side of the first fastener opening of the fuel tank band, the point of the first fastener is positioned above a vehicle-facing side of the first fastener opening of the fuel tank band, and the shank of the first fastener extends through the first fastener opening of the fuel tank band.

3. The apparatus of claim 1, wherein:

the first lifting base, the second actuator, the second lifting base, and the first fastening gun comprise a top lifting assembly of the fuel tank lifting apparatus;

the first actuator is configured to lift the top lifting assembly to a position where the fuel tank band received by the first fastening gun contacts a ground-facing surface of the fuel tank such that the fuel tank is cradled by the received fuel tank band; and the second actuator is configured to, in response to the received fuel tank band contacting the ground-facing surface of the fuel tank, lift the received fuel tank band and the cradled fuel tank to the ground-facing surface of the vehicle by lifting the second lifting base relative to the first lifting base.

4. The apparatus of claim 3, further comprising an electronic controller configured to control the first actuator and the second actuator.

5. The apparatus of claim 4, wherein the electronic controller is further configured to, in response to the received fuel tank band and the cradled fuel tank being lifted to the ground-facing surface of the vehicle, control the first fastening gun to drive the first fastener through the first fastener opening located at the ground-facing surface of the vehicle.

6. The apparatus of claim 1, further comprising a vertically-positioned second fastening gun mounted on the second lifting base, the second fastening gun having a vehicle-facing end configured to receive a head of a vertically positioned second fastener, the second fastening gun also configured to receive the fuel tank band, wherein:

the fuel tank band further comprises a second fastener opening located at a second distal end of the fuel tank band, and when the fuel tank band is received by the second fastening gun, the second fastener is secured through the second fastener opening of the fuel tank band.

* * * * *